(12) United States Patent
Neumann et al.

(10) Patent No.: US 10,730,443 B2
(45) Date of Patent: Aug. 4, 2020

(54) FASTENER AND SUBSTRATE ASSEMBLIES

(71) Applicant: Ford Global Technologies LLC, Dearborn, MI (US)

(72) Inventors: Michael Neumann, Gisborne (AU); Campbell Norris, Bundoora (AU); Rajpreet Singh Dhaliwal, Hillside (AU); Andrew David Clarke, Tallarook (AU)

(73) Assignee: Ford Global Technologies LLC, Dearborn, MI (US)

( * ) Notice: Subject to any disclaimer, the term of this patent is extended or adjusted under 35 U.S.C. 154(b) by 18 days.

(21) Appl. No.: 16/211,553

(22) Filed: Dec. 6, 2018

(65) Prior Publication Data

US 2019/0184886 A1 Jun. 20, 2019

(30) Foreign Application Priority Data

Dec. 14, 2017 (CN) .......................... 2017 1 1337604

(51) Int. Cl.
*B60R 7/04* (2006.01)
*F16B 5/02* (2006.01)
*B60N 3/10* (2006.01)
*F16B 35/04* (2006.01)
*F16B 41/00* (2006.01)
*F16B 23/00* (2006.01)

(52) U.S. Cl.
CPC ................ *B60R 7/04* (2013.01); *B60N 3/101* (2013.01); *F16B 5/0208* (2013.01); *F16B 35/048* (2013.01); *F16B 41/002* (2013.01); *F16B 23/0038* (2013.01)

(58) Field of Classification Search
CPC ......... B60R 7/04; B60R 7/043; F16B 41/002; F16B 5/0208
USPC .............................................. 296/24.34, 37.8
See application file for complete search history.

(56) References Cited

U.S. PATENT DOCUMENTS

| 2,115,312 | A | * | 4/1938 | Lombard | .............. | F16B 37/041 |
| | | | | | | 411/547 |
| 2,399,958 | A | * | 5/1946 | Tinnerman | ............ | F16B 37/041 |
| | | | | | | 411/175 |
| 3,126,935 | A | * | 3/1964 | Tuozzo | ................. | F16B 41/002 |
| | | | | | | 411/352 |
| 3,505,921 | A | * | 4/1970 | Wigam | ................. | F16B 37/067 |
| | | | | | | 411/34 |
| 4,509,890 | A | * | 4/1985 | Hill | ........................ | F16B 41/002 |
| | | | | | | 411/107 |
| 4,927,200 | A | | 5/1990 | Wilkins | | |
| 5,048,083 | A | | 9/1991 | Dunchock | | |
| 5,106,143 | A | | 4/1992 | Soeters | | |
| 6,116,674 | A | | 9/2000 | Allison et al. | | |

(Continued)

*Primary Examiner* — Dennis H Pedder
(74) *Attorney, Agent, or Firm* — David Coppiellie; Kolitch Romano LLP

(57) ABSTRACT

A fastener is provided to be pre-assembled to a substrate. The fastener comprises a shaft having a first end and a second end opposite the first end, and a thread portion adjacent to the second end; a head disposed on the first end; and a unidirectional retention member between the head and the thread portion. The unidirectional retention member is configured to pass through a mounting hole of the substrate in one direction such that the fastener is retained on the substrate once the unidirectional retention member has passed through the mounting hole.

19 Claims, 8 Drawing Sheets

(56) References Cited

U.S. PATENT DOCUMENTS

| | | | |
|---|---|---|---|
| 6,364,390 B1 | 4/2002 | Finneman | |
| 6,871,431 B2 * | 3/2005 | Schmidt | B60R 13/105 |
| | | | 40/200 |
| 7,055,882 B2 | 6/2006 | Santaolalla Gil et al. | |
| 7,222,906 B2 | 5/2007 | Sakakibara et al. | |
| 8,292,562 B2 * | 10/2012 | Chiu | F16B 35/041 |
| | | | 411/107 |
| 8,714,613 B1 * | 5/2014 | Gillis | B60R 7/04 |
| | | | 296/24.34 |
| 2014/0049063 A1 * | 2/2014 | Yamaguchi | B60R 7/04 |
| | | | 296/24.34 |

* cited by examiner

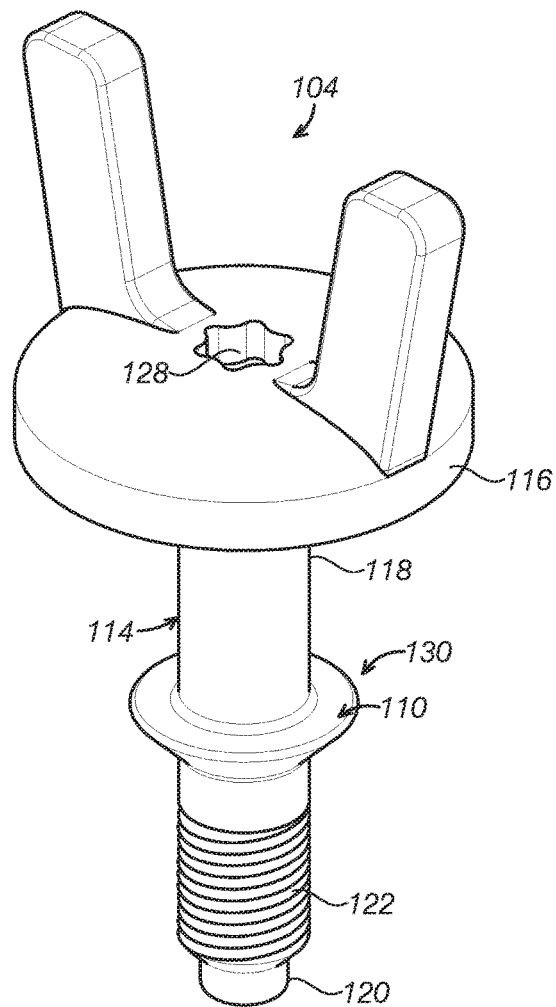
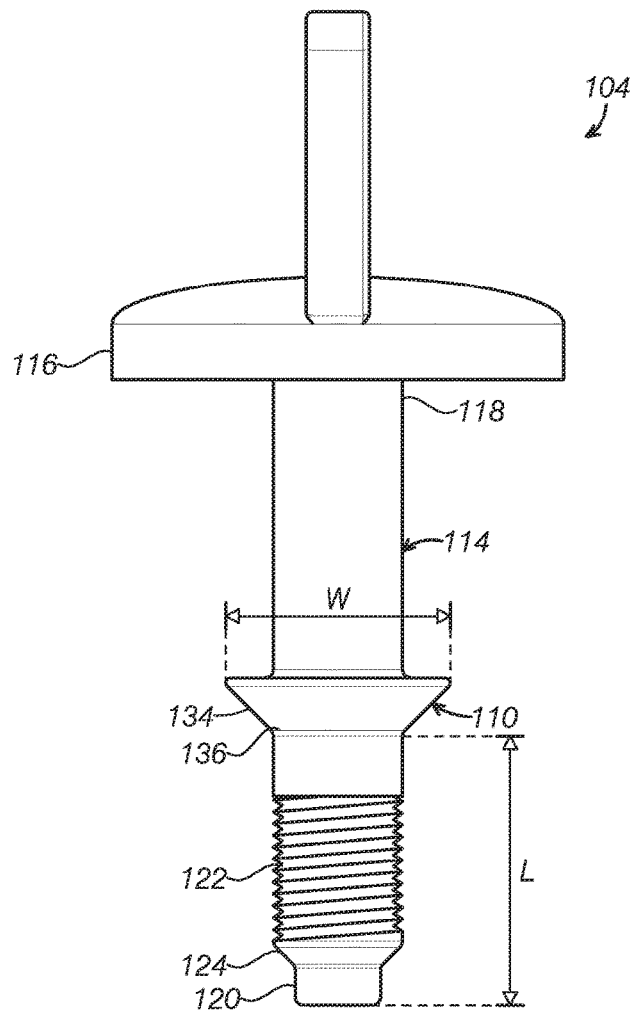
FIG. 3A
FIG. 3B

FASTENER AND SUBSTRATE ASSEMBLIES

RELATED APPLICATION

This application claims the benefit of Chinese Patent Application No.: CN 201711337604.5 filed on Dec. 14, 2017, the entire contents thereof being incorporated herein by reference.

FIELD

The present disclosure relates to a fastener and substrate assembly, specifically relates to a fastener and substrate assembly in which a fastener is retained on the substrate.

BACKGROUND

Many parts in a vehicle environment are designed to be removable to meet a customer's need. For example, a console for second-row seats is removable to provide a flat floor after the second-row seats have been taken off. The vehicle parts are usually connected to a vehicle body by fasteners such as clips and screws. The clips may not be stable in the connection while the screws are separated from the vehicle part at a disassembled state and may have an issue of getting lost. Further, the screws consisting of several parts may require multiple assembling steps (e.g., assembling a screw shaft within a nesting hole first and then fastening). Thus, there exists a need for a fastening assembly that provides robust connection while keeps being retained on the vehicle part.

SUMMARY

According to one aspect of the present disclosure, a fastener is provided to be pre-assembled to a substrate. The fastener comprises a shaft having a first end and a second end opposite the first end, and a thread portion adjacent to the second end; a head disposed on the first end; and a unidirectional retention member between the head and the thread portion. The unidirectional retention member is configured to pass through a mounting hole of the substrate in one direction such that the fastener is retained on the substrate once the unidirectional retention member has passed through the mounting hole.

In one embodiment, the unidirectional retention member may be a conical collar surrounding the shaft and has a maximum diameter portion towards the head.

In another embodiment, the head may comprise a pair of screw wings or the head includes a recess to receive a tip of a screw driver.

In another embodiment, a shaft diameter may be smaller than a smallest dimension of the mounting hole.

In another embodiment, a length between a connection of the conical collar and the second end may be configured such that the conical collar is between the substrate and a part to be connected at an assembled position.

In another embodiment, the thread portion of the fastener may be configured to engage with a corresponding thread portion of a connector for a part to be connected thereby fastening the substrate to the part.

According to another aspect of the present disclosure, a fastener and substrate assembly is provided. The fastener and substrate assembly comprises a substrate including a mounting hole and a flexing portion surrounding the mounting hole; and a fastener preassembled to the substrate. The fastener includes a shaft having a first end, a second end opposite the first end and a thread portion adjacent to the second end; a head disposed on the first end; and unidirectional retention member between the head and the thread portion. The unidirectional retention member is configured to pass through the mounting hole of the substrate in one direction such that the fastener is retained on the substrate once the unidirectional retention member has passed through the mounting hole.

In one embodiment, the unidirectional retention member may be a conical collar formed on the shaft, and an outside surface of the conical collar may extend from a connection closer to the second end to the shaft towards the head.

In another embodiment, the unidirectional retention member may include a plurality of projections distributed intermittently around a circumference of the shaft and each projection may have a tapered surface to guide its passing through the mounting hole on the substrate.

In another embodiment, the mounting hole of the substrate may have a length and a width less than the length. A diameter of the conical collar may be larger than the width.

In another embodiment, the mounting hole of the substrate may be circular, and a diameter of the conical collar may be larger than a diameter of the mounting hole.

In another embodiment, the flexing portion may have a thickness less than that of a main body the substrate.

In another embodiment, the flexing portion may have an inclined surface sloped at an assembling direction to facilitate the unidirectional member of the fastener to pass through.

In another embodiment, the flexing portion may include a plurality of cutouts distributed along a circumference to facilitate bending of the flexing portion at an assembling direction to allow passing through of the unidirectional member.

In another embodiment, the substrate may be a plastic part.

In another embodiment, the substrate may be a sheet metal part.

According to yet another aspect of the present disclosure, a cup holder console in a vehicle is provided. The cup holder console comprises a main body including a plurality of walls, at least one wall having a mounting hole and at least one fastener. The fastener includes a shaft having a first end, a second end opposite the first end and a thread portion adjacent to the second end; a head disposed on the first end; and a unidirectional retention member between the head and the thread portion. The unidirectional retention member is configured to pass through the mounting hole of the wall only in one direction and the fastener is preassembled to the main body.

In one embodiment, the unidirectional retention member may be a protrusion on the shaft and may have a sloped surface extending from a connection on the shaft closer to the second toward the head of the shaft. The protrusion on the shaft may have a dimension larger than a dimension of the mounting hole of the wall at a plane perpendicular to the shaft.

In another embodiment, the mounting hole of the wall may be surrounded by a flexing portion, and the flexing portion may have an inclined surface to guide the unidirectional retention member to pass through the mounting hole of the wall.

In another embodiment, the main body may include a sidewall and bottom wall each may include a mounting hole to receive a corresponding fastener.

In another embodiment, the thread portion of the fastener may be configured to be engaged with a threaded nut attached on a vehicle floor.

As it is retained to the substrate, the fastener would not get lost during repeated assembling and dissembling process of the substrate to a part. A single-piece fastener configuration simplifies the assembling process. Further, the unidirectional retention member of fastener and the flexing portion of the substrate allow the fastener to be easily assembled by an intrusion force into a substrate hole only in one direction and retained on the substrate once the unidirectional retention member passes the mounting hole of the substrate.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 3A is a perspective view of the fastener according to one embodiment of the present disclosure.

FIG. 3B is a sectional view of the fastener in FIG. 3A.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed fastener and substrate assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various fastener and substrate assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
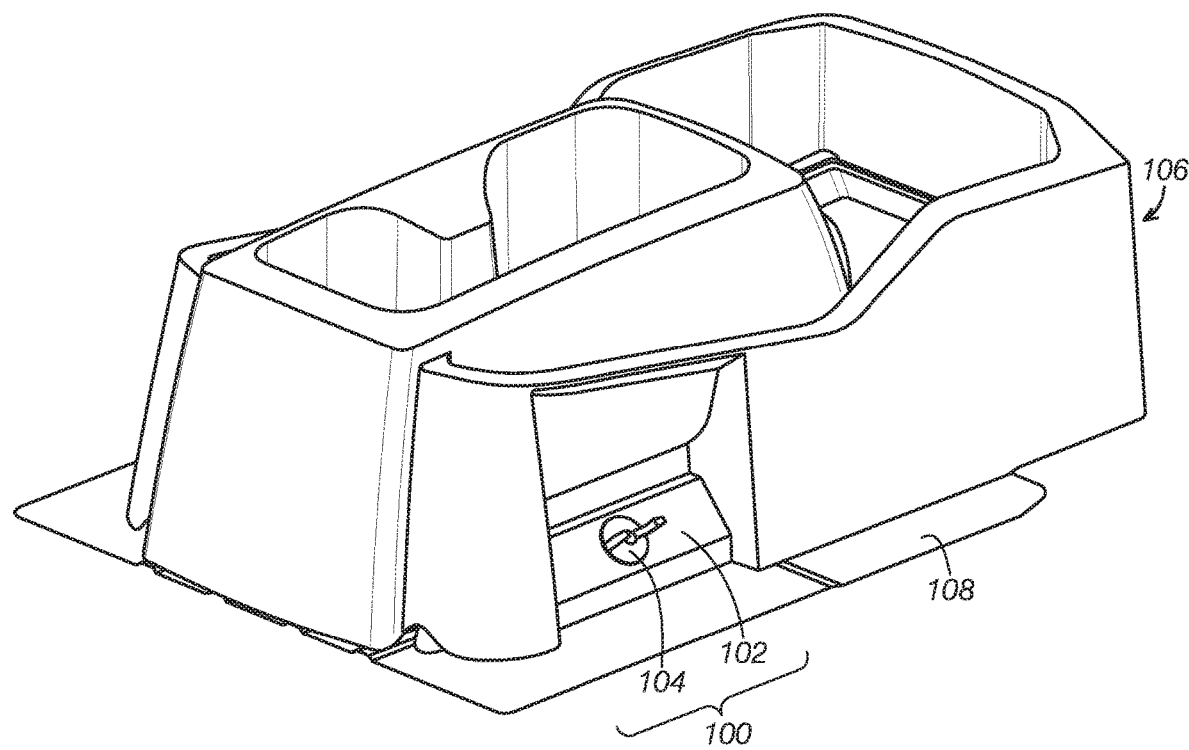
FIG. 1 is a perspective view of a cup holder console, illustrating an environment in which a fastener and substrate assembly is implemented according to one embodiment of the present disclosure.
Figure 2:
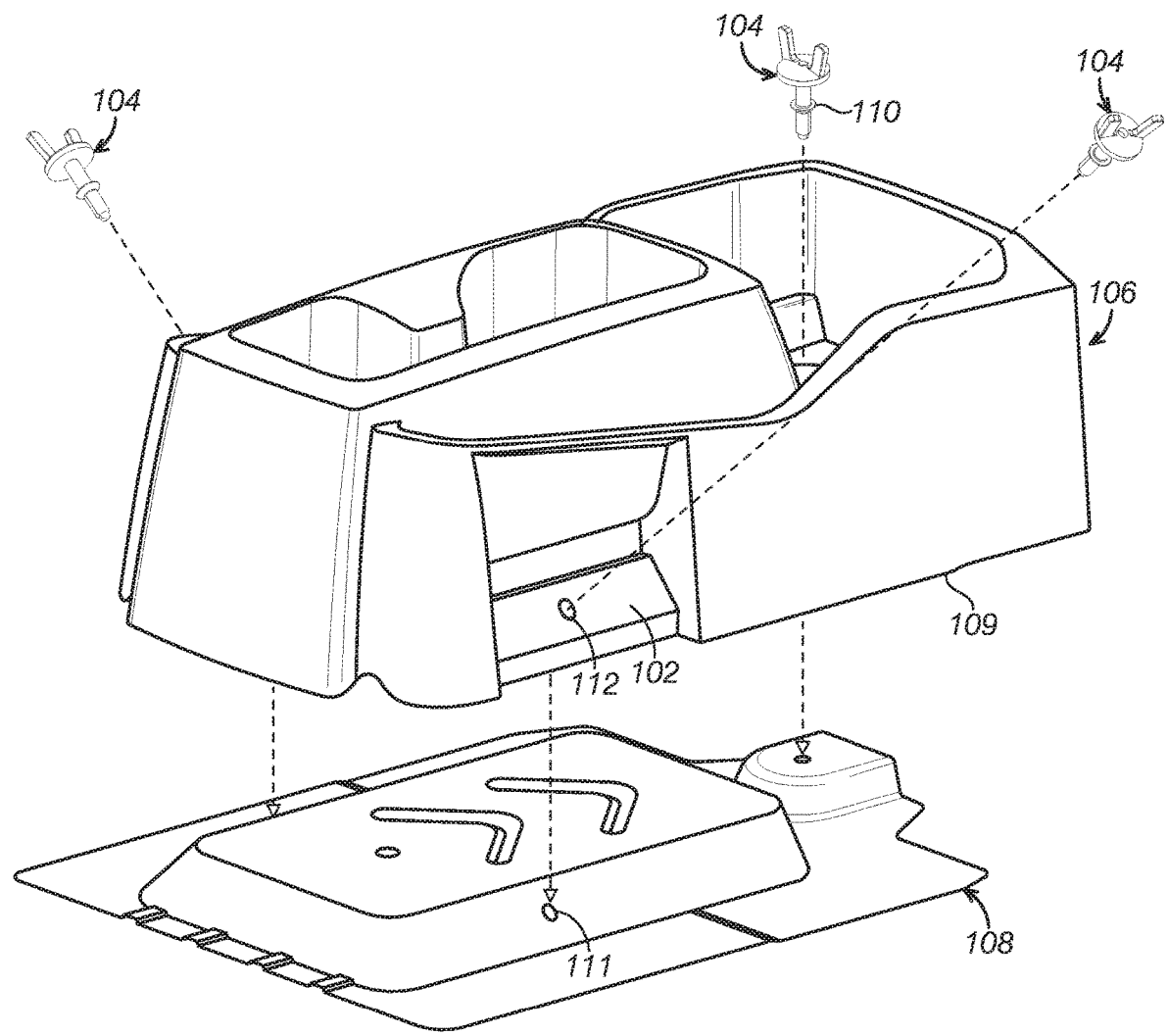
FIG. 2 is an exploded perspective view of the fastener and substrate assembly and a vehicle body in FIG. 1.

FIG. 1 is a perspective view of a cup holder console, illustrating an environment in which a fastener and substrate assembly 100 is implemented according to one embodiment of the present disclosure. FIG. 1 shows that the fastener and substrate assembly 100 includes a substrate 102 and a fastener 104, and is connected to a part 108. FIG. 2 shows perspective views of the fastener and substrate assembly 100 and the part 108. In the depicted embodiment, the substrate 102 is a wall of a center console 106 which is removably connected to the part 108, i.e., a vehicle body or a vehicle floor 108 of a vehicle, for an example. In some embodiments, the fastener 104 is permanently retained on the substrate 102 as described in detail below. The term "permanently retained" refers to retention of two parts which cannot be separated once preassembled. With the unidirectional retention feature, the fastener 104 is always attached to the substrate 102 such that the fastener 104 will not get lost during the disassembling and the assembling processes.

FIG. 2 is an exploded perspective view of the fastener and substrate assembly 100 and the vehicle body 108 in FIG. 1. As can be seen, the fastener 104 may include a unidirectional retention member 110. The substrate 102 may include a mounting hole 112 with a diameter less than a diameter of the unidirectional retention member 110. When the unidirectional retention member 110 is pushed into the mounting hole 112 by an intrusion force, the fastener 104 is permanently retained on the substrate 102.

In the depicted embodiment, the center console 106 may be a cup holder console disposed on a second seat row of the vehicle. The cup holder console 106 includes a wall 102 (i.e., the substrate to which the fastener 102 is attached) and a bottom wall 109. The wall 102 and the bottom wall 109 include amounting holes 112. A plurality of fasteners are provided to secure the cup holder console 106 on the vehicle floor 108. The fasteners 104 are preassembled to the wall 102 and the bottom wall 109 of the cup holder console 106 and then the cup holder console 106 is fixed to the vehicle floor 108 by tightening the fasteners. When the cup holder console 106 needs to be taken off from the vehicle floor 108, the fasteners 104 can be turned loose or disengaged such that the cup holder console 106 can be removed from the vehicle floor 108. However, the fasteners 104 are still attached to the cup holder console 106 and thus the risk to lose the fastener are eliminated. FIG. 2 also shows a hole 111 on the part 108 to allow passing of the fastener 104 to be connected with a connector under the part 108 (not shown).

It should be appreciated that the center console 106 is an example substrate of the fastener and the substrate assembly of the present disclosure. The substrate may be any part needs to be connected to another part and may need to be assembled and disassembled in use.

Figure 6A:
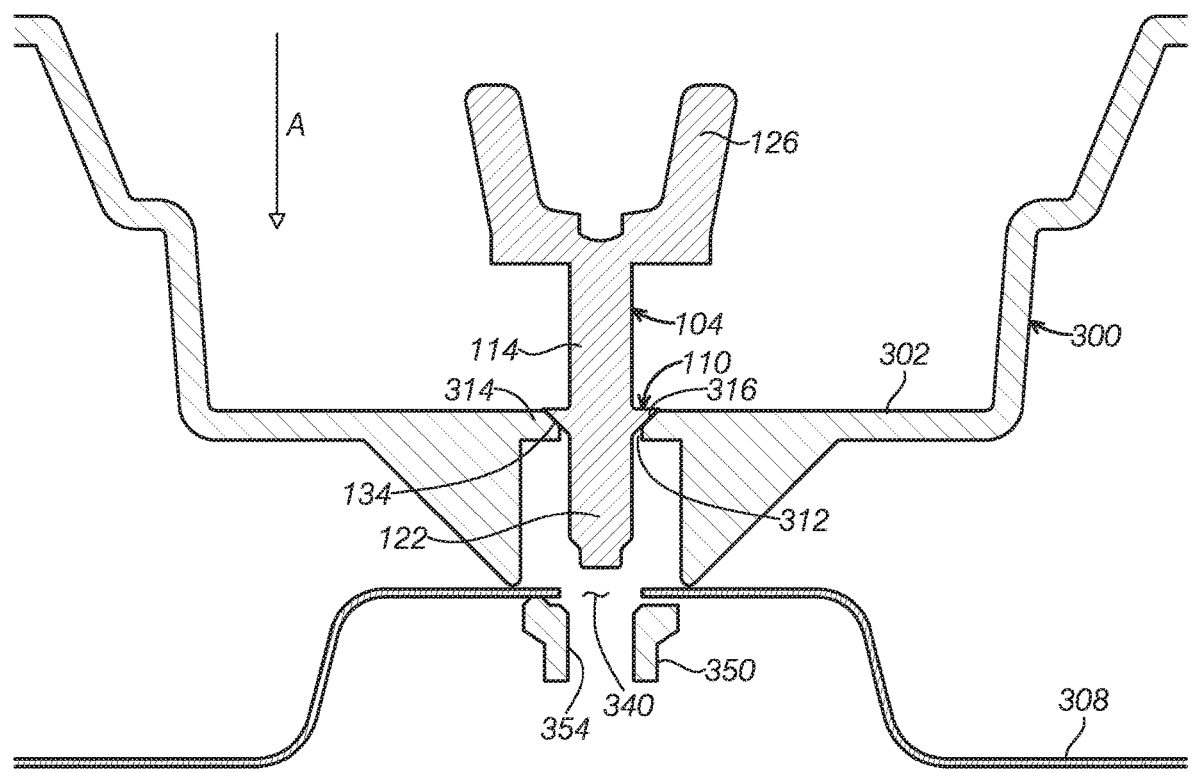
FIGS. 6A, 6B and 6C are cross sectional views of a fastener and substrate assembly in FIG. 5, illustrating a process of assembling the fastener and substrate assembly to a part.
Figure 6B:
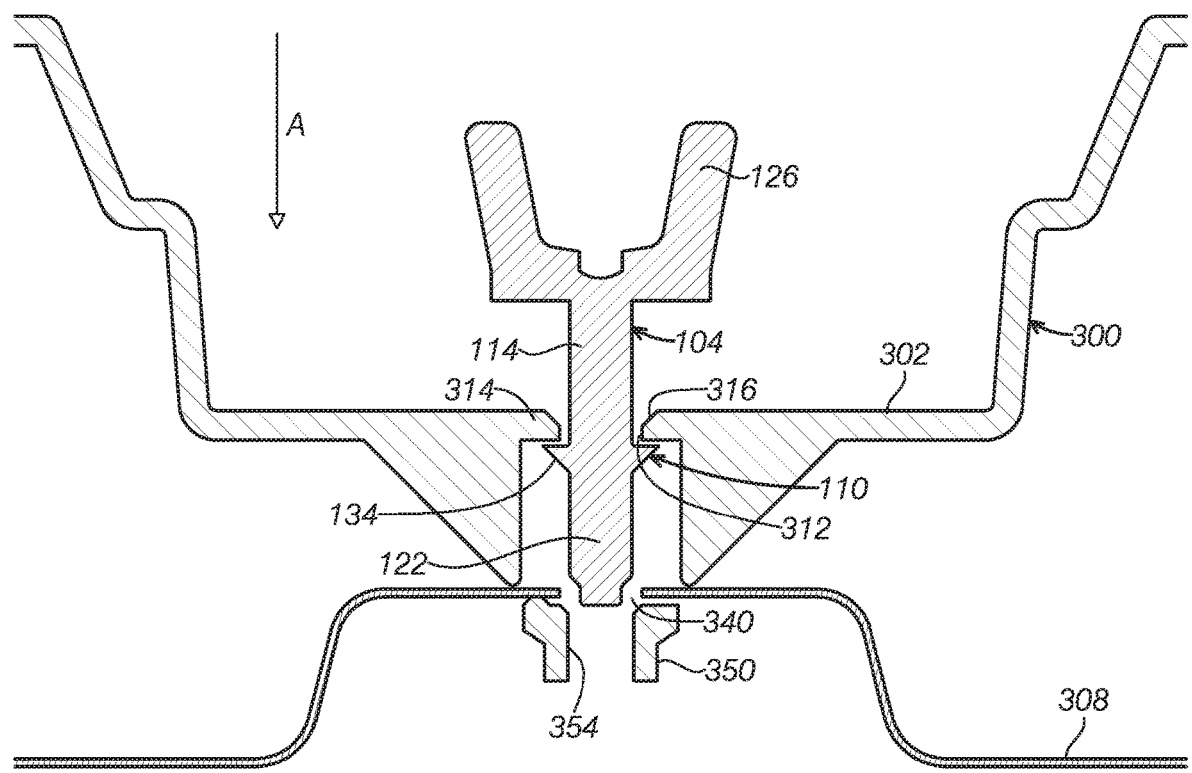
Figure 6C:
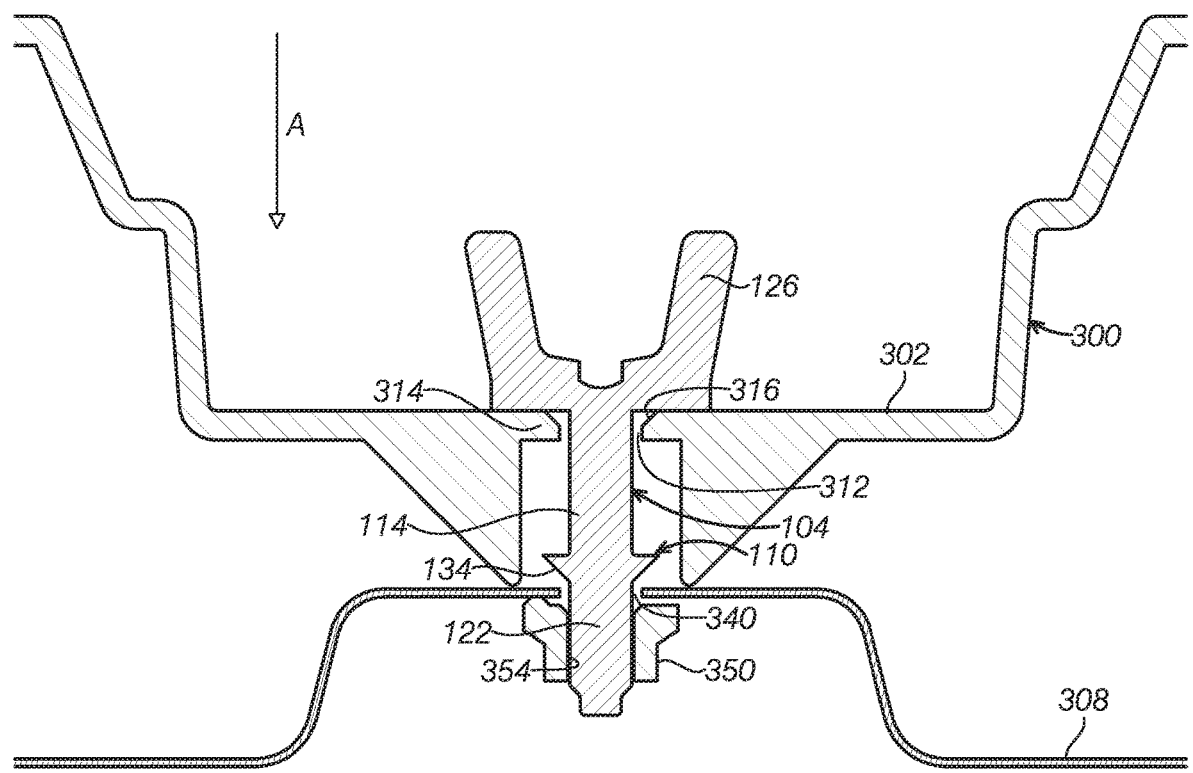

Referring to FIGS. 3A and 3B, FIG. 3A is a perspective view of the fastener 104 and FIG. 3B is a sectional view of the fastener 104. The fastener 104 includes a shaft 114, a head 116 and a unidirectional retention member 110 disposed on the shaft 114. The shaft 114 may include a first end 118 and a second end 120 opposite to the first end 118 and a thread portion 122 adjacent to the second end 120. A shaft diameter of the shaft 114 is configured to be smaller than a smallest dimension W of the mounting hole of a substrate (e.g., the mounting hole 112 in FIG. 2) such that the shaft 114 can pass through. The thread portion 122 may be configured to engage with a corresponding thread portion of a connector on a part to be connected (e.g., a connector under the part as shown in FIGS. 6A-6C). Additionally or alternatively, the thread portion 122 terminates in a chamfer 124 to facilitate insertion into the mounting hole on the substrate.

The head 116 is disposed on the first end 118 and extends from the shaft 114 in a radial direction. In some embodiments, the fastener 104 may include a pair of screw wings 126 connected to and above the head 116 for a user to hold and manually rotate the fastener. That is, the fastener 104 has a function of a screwdriver to drive itself and thus a tool such as a screwdriver is not needed when fixing the substrate to a part by the fastener 104. Alternatively or additionally, the fastener 104 may include a recess 128 to receive a head of a screwdriver such that the fastener 104 can be driven into the substrate 102 using the screw driver. The recess 128 on the head 116 may have a shape of a standard hex or a square shape to accommodate a tip of the screwdriver.

Continuing with FIGS. 3A and 3B with further reference to FIGS. 1 and 2, the unidirectional retention member 110 is disposed between the head 116 and the thread portion 122. The unidirectional retention member 110 is configured to pass through the mounting hole 112 of the substrate 102 in one direction or an assembling direction. In some embodiments, the unidirectional retention member 110 may include a protrusion 130 formed on the shaft 114 and extending at a radial direction. The protrusion 130 has a tapered surface 134 extending from a connection 136 to the shaft 114 away from the shaft 114 and toward the head 116. The connection 136 is at a location closer to the second end 120. The part of the protrusion 130 closest to the head 116 has a maximum width W. In some embodiments, the protrusion has a dimension larger than a dimension of the mounting hole 112 at a plane perpendicular to the shaft 114 or the width W of the protrusion 130 is larger than a width of the mounting hole 112. In some embodiments, the protrusion 130 surrounds an entire circumference of the shaft 114 and has a shape of conical section. In other words, the unidirectional retention member 110 is a conical collar. The unidirectional retention member 110 may have solid conical shape as illustrated in figures or a hollow conical shape. Alternatively, the protrusion 130 may include a plurality of projections distributed intermittently around a circumference of the shaft 114 and each having a tapered surface to guide its passing through the mounting hole 112 on the substrate 102.

A length L between the connection 136 of the conical collar 130 and the second end 120 is configured such that the unidirectional retention member 110 is between the substrate 102 and the part to be connected at an assembled position.

The fastener 104 may be integrally formed in any appropriate processes. In some embodiments, the fastener 104 may be made from metallic material. It should be understood that the fastener can be made from any appropriate materials that is harder or softer than the substrate as long as the substrate provides the required flexing for easy preassembling and prevention of disassembling of the fastener.

Figure 4A:
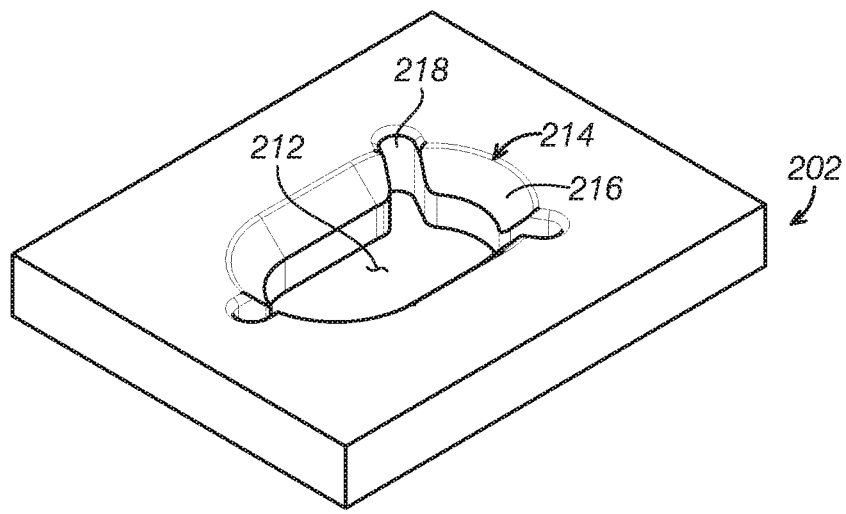
FIG. 4A is a perspective view of a substrate of a fastener and substrate assembly according to one embodiment of the present disclosure.
Figure 4B:
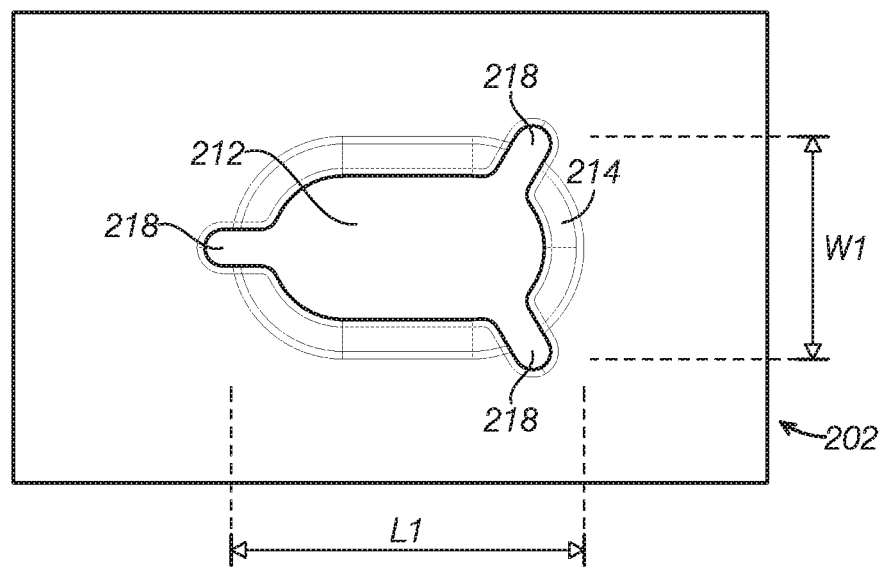
FIG. 4B is a plan view of the substrate of the fastener and substrate assembly in 4A.

FIG. 4A is a perspective view of a substrate 202 of a fastener and substrate assembly according to one embodiment of the present disclosure. FIG. 4B is a plan view of the substrate 202 of the fastener and substrate assembly in FIG. 4A. The substrate 202 includes a mounting hole 212 and a flexing portion 214 surrounding the mounting hole 212. The flexing portion 214 is configured to facilitate the passage of a fastener in one direction or an assembling direction. In some embodiments, the flexing portion 21A has a thickness less than that of a main body of the substrate 202 to assist deformation or bending at the assembling direction. In some embodiments, the flexing portion 214 has an inclined surface 216 which inclines at a same direction as that of a unidirectional retention member of the fastener to further facilitate the bending of the flexing portion and guide an insertion of the unidirectional retention member of the fastener. In some embodiments, the flexing portion 214 may further include a plurality of cutouts 218 distributed along a circumference to make the flexing portion 214 more deformable. In the depicted embodiment, the flexing portion 214 includes three cutouts. It should be appreciated that any number of the cutouts are possible depending on the requirement for the flexing.

Continuing with FIGS. 4A and 4B, the mounting hole 212 is of an oval shape, has a length L1 and a width W1 less than the length L1. The mounting hole 212 is configured to have the width W1 less than a dimension of the unidirectional retention member or a diameter of a conical collar of the fastener. The diameter of the conical collar varies at a lengthwise direction of the fastener. However, the diameter of the conical collar becomes greater than the width W1 of the mounting hole 212 at a cross section of the shaft of the fastener. The configuration of the unidirectional retention member as well as a flexing of the profile of the flexing portion of the substrate allows easy passing of the unidirectional retention member at an assembling direction. The material with different elasticity or hardness may further facilitate the deformation needed for the insertion of the unidirectional retention member through the mounting hole 212. For example, the fastener made from metallic material can deform the substrate made from the plastic material easily. As the unidirectional retention member of the fastener and the flexing portion of the substrate are configured for one direction movement through the mounting hole 212, the fastener would not be separated from the substrate once the unidirectional retention member has passed through the mounting hole 212.

It should be appreciated that the mounting hole an have any suitable shape such as a circular shape. In the embodiment where the mounting hole has a circular shape, a diameter of the conical collar of the fastener is larger than a diameter of the mounting hole of the substrate.

In some embodiments, the substrate is made from plastic that has a flexing property. The mounting hole 212 and the flexing portion 214 may be formed in an injection molding. In some embodiments, the substrate is made from a sheet metal part which is deformable under a force.

Figure 5:
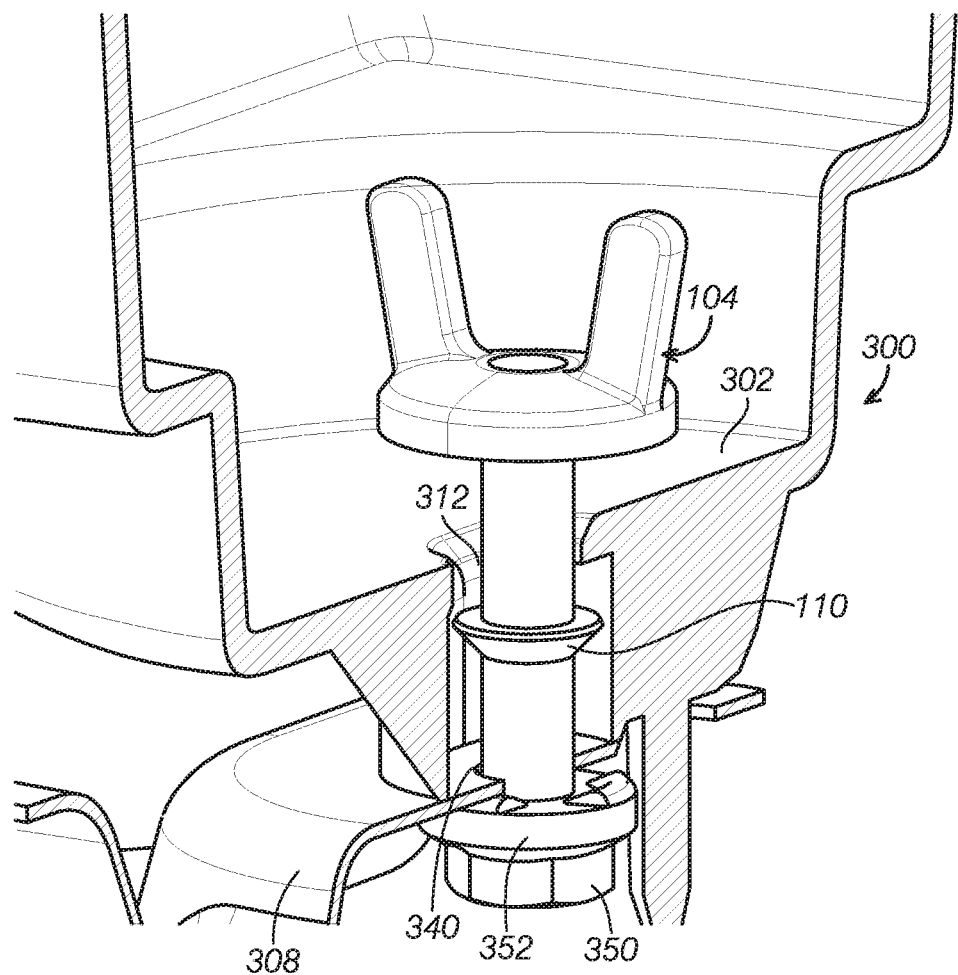
FIG. 5 is a perspective view of a fastener and substrate assembly, illustrating a perspective view of a fastener and cut away views of a substrate and a part to be connected according to one embodiment of the present disclosure.

FIG. 5 shows a fastener and substrate assembly 300 and a part 308 to be connected, illustrating a perspective view of a fastener 104 and cut away views of a substrate 302 and the part 308 according to one embodiment of the present disclosure. FIG. 5 shows that the fastener and substrate assembly 300 at an assembled position. As can be seen, the unidirectional retention member 110 has passed through the mounting hole 312 on the substrate 302 and a hole 340 on the part 308 and is positioned between the substrate 302 and the part 308. A connector 350 is disposed under the part 308. In the depicted embodiment, the connector 350 is a threaded nut having an inner thread portion (not shown). The thread portion 122 of the fastener 104 engages with the inner thread portion of the nut 350 to fix the fastener and substrate assembly 300 on the part 308. In the depicted embodiment, a bush 352 is disposed between the part 308 and the connector 350.

FIGS. 6A, 6B and 6C are cross sectional views of a fastener and substrate assembly 300 in FIG. 5, illustrating processes of preassembling and assembling the fastener and substrate assembly 300 to a part 308. FIG. 6A shows that a fastener 104 is at a state before being preassembled and a unidirectional retention member 110 substantially contacts the substrate 302. In the depicted embodiment, the unidirectional retention member 110 is a conical collar. A tapered surface 134 of the unidirectional retention member 110 contacts an inclined surface 316 of the flexing portion 314 of the substrate 302. With further pushing in an assembled direction A, the flexing portion 314 of the substrate 302 will bend away to allow the passing through of the conical collar 110. As can be seen, the tapered surface 134 of the unidirectional retention member 110 and the inclined surface 316 of the substrate 302 can guide the movement of the fastener 104 in the assembled direction A. In some embodiments, the substrate 302 is made from plastic material which is more deformable than the fastener 104 made from metallic material, which further favors the bending of the substrate at the assembled direction under a force. In some embodiments, the substrate 302 is made from a sheet metal part which flexes due to smaller thickness, which also enables bending of the substrate at the assembled direction A.

FIG. 6A further shows the connector 350 disposed beneath the part 308. The connector 350 includes an inner thread portion 354.

As both the unidirectional retention member 110 of the fastener 104 and the flexing portion 314 of the substrate 302 are configured to have directional flexibility at the assembling direction A, the fastener 104 can be easily preassembled by pushing the 110 unidirectional retention member 110 through the mounting hole 312 with an intrusion pushing force. FIG. 6B shows the fastener and substrate assembly 300 at a preassembled state. At the preassembled state, the unidirectional retention member 110 has passed through the mounting hole 312. The unidirectional retention member 110 has a diameter greater than that of the mounting hole 312 and passes through the mounting hole 312 of the substrate 302 via deformation of the substrate 302. However, it is difficult to disassemble the fastener 104 from the substrate 302 through the mounting hole 312 due to the structures of the unidirectional retention member 110 of the fastener 104 and the flexing portion 314 of the substrate 302. Thus, the fastener 104 is retained permanently on the substrate 302.

FIG. 6C shows that the fastener and the substrate assembly 300 at an assembled position. Upon further insertion of the fastener 104, the thread portion 122 of the fastener 104 penetrates a hole 340 on the part 308 and aligns with a hole 340 on the part 308. In the depicted embodiment, the fastener 104 has a pair of screw wings 126, a user can rotate the screw wings 126 when an end of the shaft 114 of the fastener 104 reaches the hole 340 of the part 308. The rotation makes the thread portion 122 of the fastener 104 engage with an inner thread portion 354 of the connector 350 to fix the fastener and substrate assembly 300 to the part 308. At the assembled position, the unidirectional retention member 110 is positioned between the substrate 302 and the part 308.

The fastener and the fastener and substrate assembly of the present disclosure have various advantages. For example, the fastener is a single piece and thus eliminate the steps of assembling multiple screw feature components. The unidirectional feature of both fastener and the substrate allows the fastener to pass through a hole of the substrate easily to be preassembled while preventing the removal of the fastener from the substrate. In this way, the fastener can be retained on the substrate and go with the substrate during the assembling and disassembling processes. Further, the self-driving feature of the fastener can eliminate the need for a tool in some circumstances.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A fastener to be pre-assembled to a substrate, comprising:
   a shaft having a first end and a second end opposite the first end, and a thread portion adjacent to the second end;
   a head disposed on the first end; and
   a unidirectional retention member with a first diameter between the head and the thread portion,
   wherein the unidirectional retention member is configured to pass through a mounting hole of the substrate with a second smaller diameter in one direction such that the fastener is retained on the substrate once the unidirectional retention member has passed through the mounting hole; and
   wherein a length between a connection of the unidirectional retention member and the second end is configured such that, at an assembled position, the unidirectional retention member is between the substrate and a part to be connected, and spaced apart from the substrate and the part to be connected.

2. The fastener of claim 1, wherein the unidirectional retention member is a conical collar surrounding the shaft and has a maximum diameter portion towards the head.

3. The fastener of claim 2, wherein the head comprises a pair of screw wings or the head includes a recess to receive a tip of a screw driver.

4. The fastener of claim 2, wherein a shaft diameter is smaller than a smallest dimension of the mounting hole.

5. The fastener of claim 2, wherein the thread portion is configured to engage with a corresponding thread portion of a connector for a part to be connected thereby fastening the substrate to the part.

6. A fastener and substrate assembly, comprising:
a substrate including a mounting hole with a first diameter and a flexing portion surrounding the mounting hole; and
a fastener including:
a shaft having a first end, a second end opposite the first end and a thread portion adjacent to the second end;
a head disposed on the first end;
a unidirectional retention member with a second larger diameter between the head and the thread portion, and
wherein the unidirectional retention member has an inclined surface inclined toward the thread portion and is configured to pass through the mounting hole of the substrate in one direction such that the fastener is retained on the substrate once the unidirectional retention member has passed through the mounting hole;
wherein a length between a connection of the unidirectional retention member and the second end is configured such that the unidirectional retention member is between the substrate and a part to be connected, and spaced apart from the substrate and the part to be connected at an assembled position.

7. The fastener and substrate assembly of claim 6, wherein the unidirectional retention member is a conical collar formed on the shaft.

8. The fastener and substrate assembly of claim 6, wherein the unidirectional retention member includes a plurality of projections distributed intermittently around a circumference of the shaft.

9. The fastener and substrate assembly of claim 7, wherein the mounting hole of the substrate has a length and a width less than the length, and wherein a diameter of the conical collar is larger than the width.

10. The fastener and substrate assembly of claim 7, of the substrate is circular, wherein a diameter of the conical collar is larger than a diameter of the mounting hole.

11. The fastener and substrate assembly of claim 6, wherein the flexing portion has a thickness less than that of a main body the substrate.

12. The fastener and substrate assembly of claim 6, wherein the flexing portion has an inclined surface which is inclined at a same direction as that of the inclined surface of the unidirectional retention member to facilitate the unidirectional retention member of the fastener to pass through.

13. The fastener and substrate assembly of claim 6, wherein the flexing portion includes a plurality of cutouts distributed along a circumference to facilitate bending of the flexing portion at an assembling direction to allow passing through of the unidirectional retention member.

14. The fastener and substrate assembly of claim 6, wherein the substrate is a plastic part or a sheet metal.

15. A cup holder console in a vehicle, comprising:
a main body including a plurality of walls, at least one wall having a mounting hole with a first diameter;
at least one fastener including:
a shaft having a first end, a second end opposite the first end and a thread portion adjacent to the second end;
a head disposed on the first end;
a thread portion adjacent to the second end;
a unidirectional retention member with a second larger diameter between the head and the thread portion,
wherein the unidirectional retention member is configured to pass through the mounting hole of the wall only in one direction and the fastener is preassembled to the main body; and
wherein a length between a connection of the unidirectional retention member and the second end is configured such that the unidirectional retention member is spaced apart from the wall and a part to be connected at an assembled position.

16. The cup holder console of claim 15, wherein the unidirectional retention member is a protrusion on the shaft and has a sloped surface extending from a connection on the shaft closer to the second end toward the head of the shaft, and wherein the protrusion has a dimension larger than a dimension of the mounting hole at a plane perpendicular to the shaft.

17. The cup holder console of claim 15, wherein the mounting hole is surrounded by a flexing portion, and wherein the flexing portion has an inclined surface to guide the unidirectional retention member to pass through the mounting hole of the wall.

18. The cup holder console of claim 15, wherein the fastener includes a plurality of fasteners, and wherein the main body includes a sidewall and a bottom wall each including a mounting hole for a corresponding fastener.

19. The cup holder console of claim 15, wherein the thread portion of the fastener is configured to be engaged with a threaded nut fixed on a vehicle frame.

* * * * *